Sept. 17, 1929.    M. M. McCUTCHEON    1,728,801

SHREDDER

Original Filed Aug. 3, 1927

WITNESSES

INVENTOR
MARGARET M. McCUTCHEON
BY
ATTORNEY

Patented Sept. 17, 1929

1,728,801

UNITED STATES PATENT OFFICE

MARGARET M. McCUTCHEON, OF NEW ROCHELLE, NEW YORK

SHREDDER

Application filed August 3, 1927, Serial No. 210,343. Renewed June 12, 1929.

This invention relates to a kitchen utensil.

Some of the objects of the invention are: a kitchen utensil capable of being used for shredding edibles, such as fruits and particularly pineapples, the utensil being characterized by cutters or knives adapted to readily cut the meat of the fruit in shreds; and a utensil of the indicated character which will be made of non-corrosive or rustproof material, which may be used expeditiously for the intended purpose, and which will be inexpensive.

The nature of the invention and its distinguishing features and advantages will appear when the following specification is read in connection with the accompanying drawing, in which—

Figure 1:
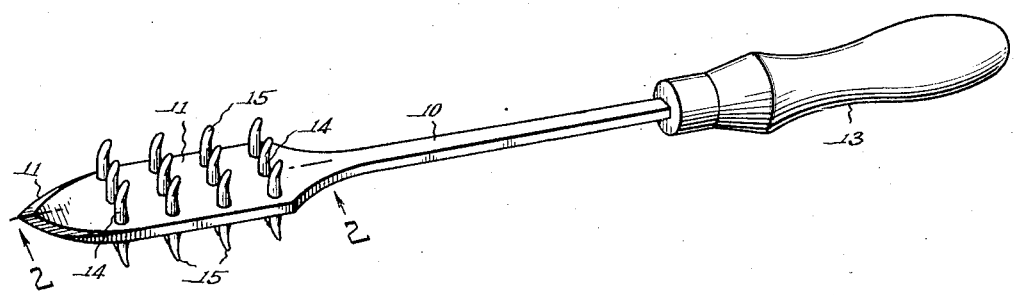
Figure 1 is a perspective view of the utensil embodying the present invention.
Figure 2:
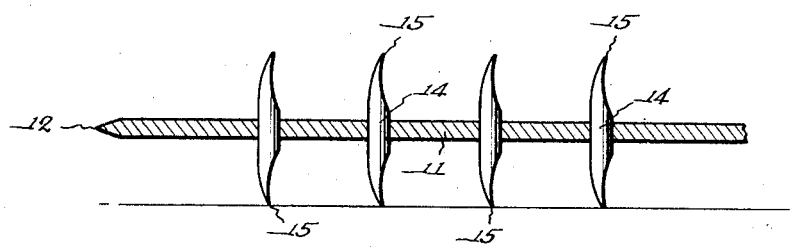
Fig. 2 is an enlarged sectional view of the effective end of the utensil, the section being taken on the line 2—2 of Fig. 1.

The utensil of the present invention includes a rigid element 10 of suitable non-corrosive or rustproof metal. The element 10 is characterized by an effective end 11 which is comparatively wide, and has a pointed cutting edge 12. The end of the element 10 remote from the end 11 has a handle 13. Arranged on the end 11 are cutters or knives 14. Each of the cutters 14 has a cutting edge 15. The cutters 14 extend crosswise of the end 11, each cutter being tightly fitted in a hole in the end 11. The cutters 14 are arranged in rows extending parallel with respect to the longitudinal axis of the element 11. It will be obvious that a series or multiplicity of cutting edges will be disposed at each side of the end 11. The cutting edges 15 will be directed rearwardly or toward the handle 13. It is to be understood that while cutting edges 15 occur at each side of the end 11, in the illustrated embodiment, that such cutting edges may occur only at one side of the end 11, although the utensil may be used to greater advantage with cutting edges 15 at both sides of the end.

In use, it is only necessary, with the aid of the cutting edge 12 to insert the effective end 11 of the utensil in the body of a pineapple without removing the core, and then to manipulate the handle 13 so that the cutters 14 will cut the meat of the fruit in shreds. In this manner the fruit may be expeditiously prepared to be served and eaten.

It is to be understood that the utensil may be made of any preferred length, and that any desired number of cutters may be used, and that the arrangement of the cutters may be diversely formulated.

I claim:

1. A utensil including a rigid element with a pointed cutting edge at one end, and cutters arranged on said element, and each of said cutters having a rearwardly directed cutting edge, said pointed cutting edge serving for the purpose of penetrating an edible product, and the cutting edges of said cutters serving for the purpose of shredding said product.

2. A utensil including a rigid element having a pointed cutting edge at one end, shredders on each side of said element, and said shredders being arranged in parallel rows, said pointed cutting edge serving for the purpose of penetrating an edible product, and said shredders serving for the purpose of shredding said product, in the manipulation of said element.

3. A utensil comprising a rigid element having a pointed end for the purpose of penetrating an edible product; a handle on the end of said element remote from the pointed end for the purpose of manipulating said element, and a multiplicity of shredders extending laterally from said element rearwardly of said pointed end, and each of said shredders having a cutting edge directed toward said handle, the cutting edges serving for the purpose of shredding said product.

4. A utensil of the character described com prising a flat rigid member having a handle on one end, the opposite end of said rigid member having a cutting edge, and cutters extending transversely of said rigid member rearwardly of the cutting edge, each of said cutters having cutting edges respectively disposed on opposite sides of said rigid member, said cutting edge serving for the purpose of penetrating an edible product, and the cutting edges serving for the purpose of shredding said product, in the manipulation of said rigid member with the handle thereof.

Signed at New Rochelle, in the county of Westchester and State of New York, this 29 day of July, A. D. 1927.

MARGARET M. McCUTCHEON.